(12) United States Patent
Chu et al.

(10) Patent No.: US 6,314,482 B1
(45) Date of Patent: Nov. 6, 2001

(54) METHOD AND SYSTEM FOR INDEXING ADAPTERS WITHIN A DATA PROCESSING SYSTEM

(75) Inventors: Simon Chu, Chapel Hill; Richard Christopher Fore, Apex; Dean Alan Kalman; Robert Victor Miller, both of Cary; Sujatha Pothireddy, Apex; Robert Paul Rowe, Cary; Marty Eugene Turner, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,208

(22) Filed: Mar. 19, 1999

(51) Int. Cl.$^7$ .................................................. G06F 13/00
(52) U.S. Cl. ............................. 710/104; 710/103; 710/9; 710/10; 703/25
(58) Field of Search ................... 710/2, 8, 9, 10, 710/103, 104; 703/25

(56) References Cited

U.S. PATENT DOCUMENTS

| | | | | |
|---|---|---|---|---|
| 4,159,518 | * | 6/1979 | Draper et al. ........................ 710/111 |
| 5,237,690 | * | 8/1993 | Bealkowski et al. ................... 717/1 |
| 5,313,592 | * | 5/1994 | Buondonno et al. ................ 710/104 |
| 5,329,634 | * | 7/1994 | Thompson ............................... 710/8 |
| 5,530,887 | * | 6/1996 | Harper et al. ........................ 710/104 |
| 5,581,787 | * | 12/1996 | Saeki et al. ............................. 710/9 |
| 5,604,887 | * | 2/1997 | Naidu et al. ..................... 395/500.48 |
| 5,768,542 | * | 6/1998 | Enstrom et al. ...................... 710/104 |
| 5,796,988 | * | 8/1998 | Naidu et al. ..................... 395/500.46 |
| 5,854,905 | | 12/1998 | Garney ................................. 710/104 |
| 5,881,252 | * | 3/1999 | Sahgal et al. ........................ 710/104 |
| 5,898,845 | * | 4/1999 | Frantz et al. ........................ 710/104 |
| 5,974,474 | * | 10/1999 | Furner et al. ............................ 710/8 |
| 5,999,989 | * | 12/1999 | Patel ....................................... 710/1 |
| 6,044,411 | * | 3/2000 | Berglund et al. ....................... 710/9 |
| 6,134,624 | * | 10/2000 | Burns et al. ........................ 710/131 |
| 6,145,019 | * | 11/2000 | Firooz et al. ........................... 710/8 |
| 6,179,486 | * | 1/2001 | Wallach et al. ..................... 710/103 |
| 6,192,434 | * | 2/2001 | Wallach et al. ..................... 710/103 |

* cited by examiner

*Primary Examiner*—Xuan M. Thai
(74) *Attorney, Agent, or Firm*—Bracewell & Patterson, LLP

(57) ABSTRACT

A method and system for indexing adapters within a data processing system where the data processing system contains multiple existing adapters, where each of the multiple existing adapters is identified by particular indexing data. All adapters within the data processing system are scanned. A determination of whether or not any additional adapters have been added to the data processing system in addition to the multiple existing adapters is made. Particular indexing data is assigned to any additional adapters in response to determining that additional adapters have been added to the data processing system, where any additional adapters added to the data processing system are indexed into the data processing system without changing the particular indexing data of each of the multiple existing adapters.

15 Claims, 5 Drawing Sheets

METHOD AND SYSTEM FOR INDEXING ADAPTERS WITHIN A DATA PROCESSING SYSTEM

BACKGROUND OF THE INVENTION

1. Field of the Invention

The present invention relates in general to an improved data processing system and in particular to an improved data processing system and method for indexing adapters within the data processing system. Still more particularly, the present invention relates to an improved data processing system and method for indexing hot-plug adapters.

2. Description of the Related Art

One of the most critical elements in a computer system is the boot-up firmware, such as Basic Input and Output System (BIOS). Typically, stored in some form of non-volatile memory, the firmware is machine code which is part of an operating system (OS) which allows a central processing unit (CPU) to perform tasks such as initialization, diagnostics, loading the operating system kernel from mass storage and routine input/output (I/O) functions. In addition, the firmware will perform scans of each adapter currently utilized within the computer system, where the adapters typically provide a connection for I/O devices, peripheral devices and additional adapters.

In typical firmware systems, an in-order scan assigns an adapter index value to each adapter being utilized, in a nondeterministic fashion. For example, if there are four adapter slots with components in the first, third and fourth slots, in an initial scan, the first slot would be assigned an index of 1, the third an index of 2 and the fourth an index of 3. However, during operation, if an additional hot-plug adapter is added to the configuration in the second slot, the firmware is triggered to perform another scan. In the second scan, the first slot would be assigned an index of 1, the second and index of 2, the third an index of 3 and the fourth an index of 4. This non-deterministic assignment of indexes leads to an inconsistent index assignment to adapters which may effect I/O operations and user understanding of adapter assignments.

The advancement of hot-plug components makes it possible for hot-plug adapters be added to a configuration while power is applied. With the addition of hot-plug adapters, it is preferable that each hot-plug adapter of the same type be assigned an index number without changing the indexing assignments made to other adapters of the same type in the system. It is apparent that a method of scanning and assigning index numbers to adapters needs to accomodate for hot-plug adapters.

SUMMARY OF THE INVENTION

It is therefore one object of the present invention to provide an improved data processing system.

It is another object of the present invention to provide an improved data processing system and method for indexing I/O adapters It is yet another object of the present invention to provide an improved data processing system and method for indexing hot-plug adapters.

A method and system for indexing adapters within a data processing system is provided, where the data processing system contains multiple existing adapters. where each of the multiple existing adapters is identified by particular indexing data. All adapters within the data processing system are scanned. A determination of whether or not any additional adapters have been added to the data processing system in addition to the multiple existing adapters is made. Particular indexing data is assigned to any additional adapters in response to determinig that additional adapters have been added to the data processing system, where any additional adapters added to the data processing system are indexed into the data processing system without changing the particular indexing data of each of the multiple existing adapters.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
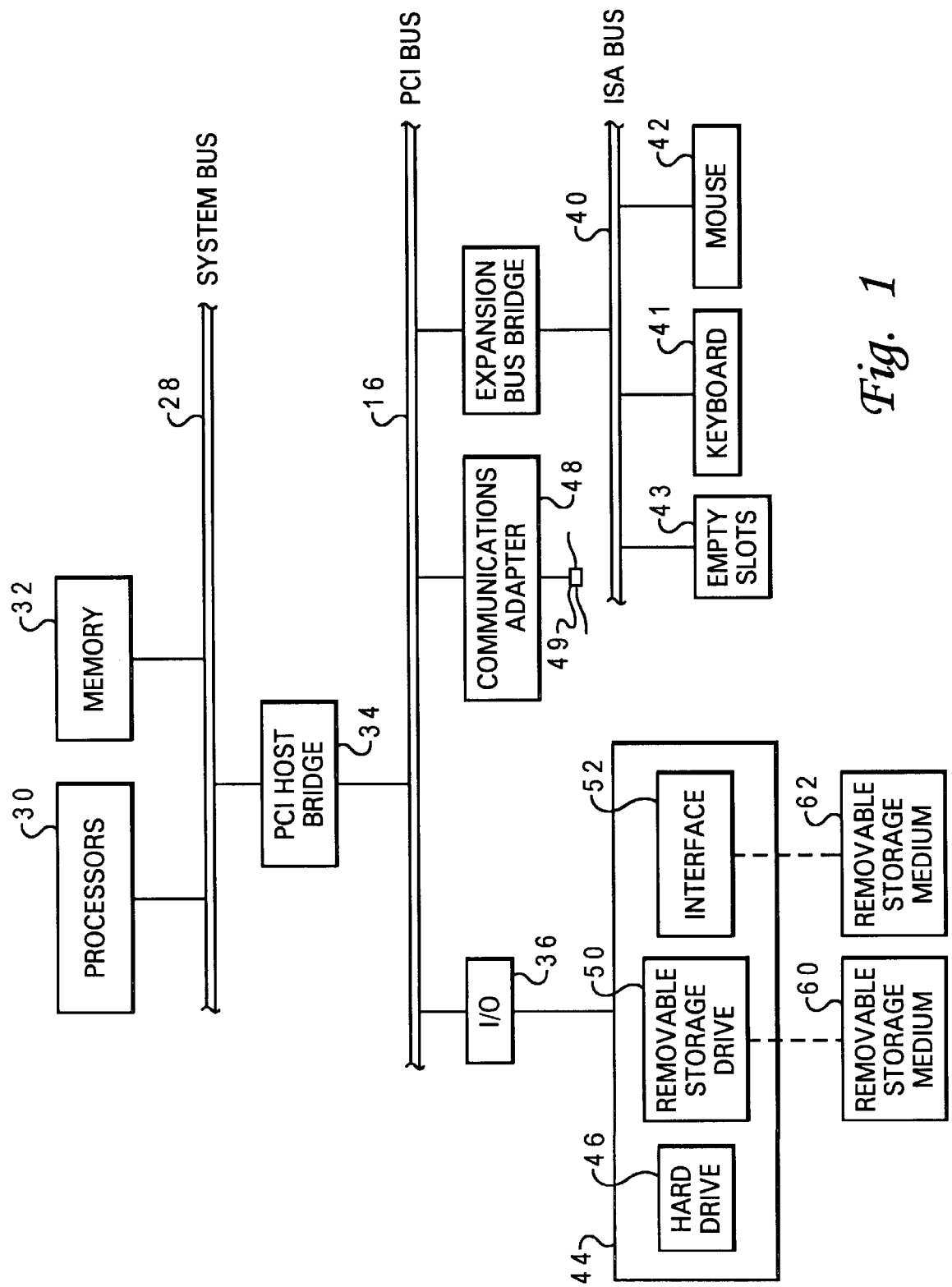
FIG. 1 depicts a block diagram representation of a data processing system to which a preferred embodiment of the present invention is applicable.

With reference now to the figures and in particular with reference to FIG. 1, there is depicted block diagram representation of a data processing system to which a preferred embodiment of the present invention is applicable. The environment is a data processing system 10 that includes processors 30 where each processor preferably includes at least one level of cache coupled thereto (not shown). Processors 30 are connected to a system bus 28. After reading the description it will be apparent to a person skilled in the relevant art how to implement the invention using other data processing systems and/or data processing system architectures.

Data processing system 10 also includes memory elements 32 connected to system bus 29, which preferably include read-only memory (ROM) and random access memory (RAM). Multiple routines are typically stored in ROM where each routine typically contains multiple processor steps. Each routine may also be represented as a function to be performed on data or an execution step. Within RAM, an operating system, having application programs incorporated, operates. As will be appreciated by those skilled in the art, memory 32 comprises a number of individual volatile memory modules which store segments of operational system, application software and other data while power is supplied to data processing system 10.

Processors 30 and memory elements 32 are also coupled to a PCI bus 16 of data processing system 10 through a PCI host bridge 34. PCI host bridge 34 provides a low latency path through which processors 30 may directly access PCI devices mapped anywhere within bus memory and/or I/O address spaces. PCI host bridge 34 also provides a high bandwidth path allowing PCI devices to directly access memory elements 32.

Also attached to PCI bus 34 is an I/O controller 36 which is utilized to control a secondary memory 44. I/O controller 36 includes at least one small computer interface (SCSI) and other I/O interfaces which are well known in the art. Secondary memory 44 includes, for example, a hard disk drive 46, a removable storage drive 50, and an interface 52. Removable storage drive 50 may represent a floppy disk drive, magnetic tape drive, an optical disc drive, or other data drive which reads and writes to a removable storage medium 60. Removable storage medium 60 represents a floppy disk, magnetic tape, optical disk, or any other data storage device which is read by and written to by removable storage drive 50. As will be appreciated by one skilled in the art, removable storage medium 60 includes a computer usable storage medium having stored therein computer software and/or data. In addition, as will be appreciated by one skilled in the art, removeable storage drive 50 may also be connected to ISA bus 40. Further, as will be appreciated by one skilled in the art, each data storage device of secondary memory 44 may interface with PCI bus 34 through an individual I/O controller, adapter or driver where each device connected to PCI bus 34 and other buses of data processing system 10 is assigned an index number such that it may be identified within said data processing system.

In alternative embodiments, secondary memory 44 may include other similar means for allowing computer programs, or other instructions to be loaded into data processing system 10. Such means may include, for example, a removable storage medium 62 and interface 52. Examples may include a program cartridge and cartridge interface, a removable chip (such as EEPROM, PROM, or PCMCIA) and associated socket, and other removable storage medium 62 and interfaces 52 which allow software and data to be transferred from removable storage device 62 to data processing system 10.

Data processing system 10 may also include a communications adapter 48 attached to PCI bus 16. Communications adapter 48 allows software and data to be transferred between data processing system 10 and external devices via ethernet link 49. Examples of communications adapter 48 include a modem, communications port, and other communications supporting hardware. Software and data transferred via communications adapter 48 are in the form of signals that can be electronic, electromagnetic, optical, or other signals capable of being received or sent by communications adapter 48 via communications path 49. In particular, communications adapter 48 provides a means by which data processing system 10 may interface a network such as a LAN or the Internet.

Expansion bus bridge 38, such as a PCI-to-ISA bus bridge may be utilized for coupling an Industry Standard Architecture (ISA) bus 40 to PCI bus 16. As illustrated, a keyboard 41 and mouse 42 may be attached to ISA bus 40 for performing certain basic I/O functions. Further, empty slots 43 are available along ISA bus 40 for attaching additional I/O devices and drives. In addition, a graphics adapter 54 is coupled to PCI bus 16 to control visual output through a video display 56.

The present invention is preferably implemented using software and hardware executing in a data processing system environment similar to that described above with respect to FIG. 1. Thus, the term "computer program product" is used to generally refer to a program stored at removable storage drive 50 or the hard disk installed in hard disk drive 46. These computer program products are means for providing software to data processing system 10.

Computer programs or computer control logic are stored in memory 32 and/or secondary memory 44 as operating system and application programs. Computer programs can also be received via communications interface 48. Such computer programs, when executed, enable data processing system 10 to perform the features of the present invention as discussed herein. Accordingly, such computer programs represent controllers of data processing system 10.

Figure 2:
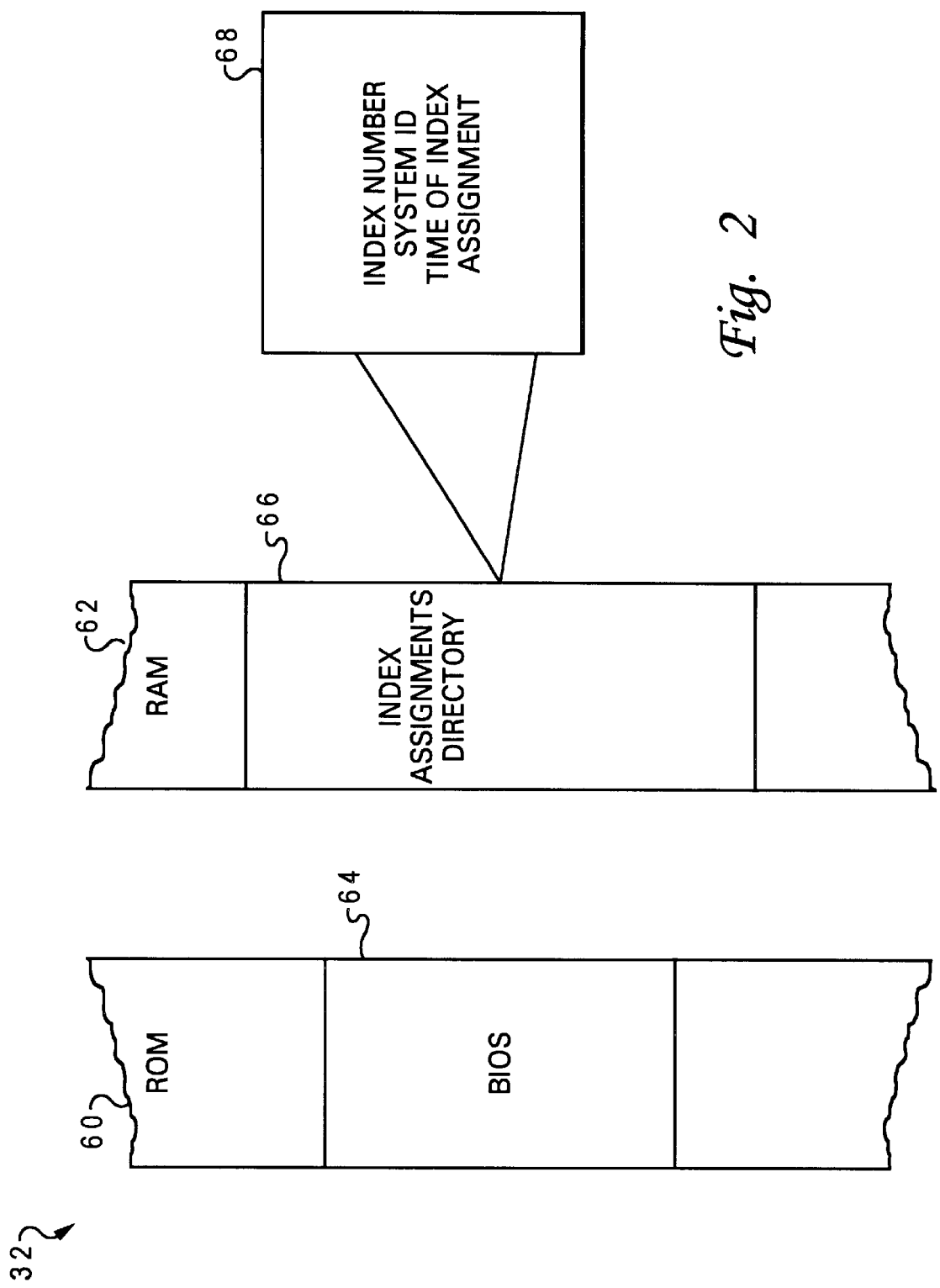
FIG. 2 illustrates a pictorial representation of memory units according to the method and system of the present invention.

Referring now to FIG. 2, there is illustrated a pictorial representation of memory 32 according to the method and system of the present invention. ROM 60 depicts a section of memory which includes BIOS 64 or other firmware for controlling the input/output operations between processors 30 and all devices in data processing system 10, in particular any devices included along PCI bus 34. RAM 62 illustrates a section of persistent memory within data processing system 10 which contains a history of index assignments 66. Each index assignment indexes a system ID and time of index assignment in addition to other data which may be utilized to identify a particular device.

Figure 3:
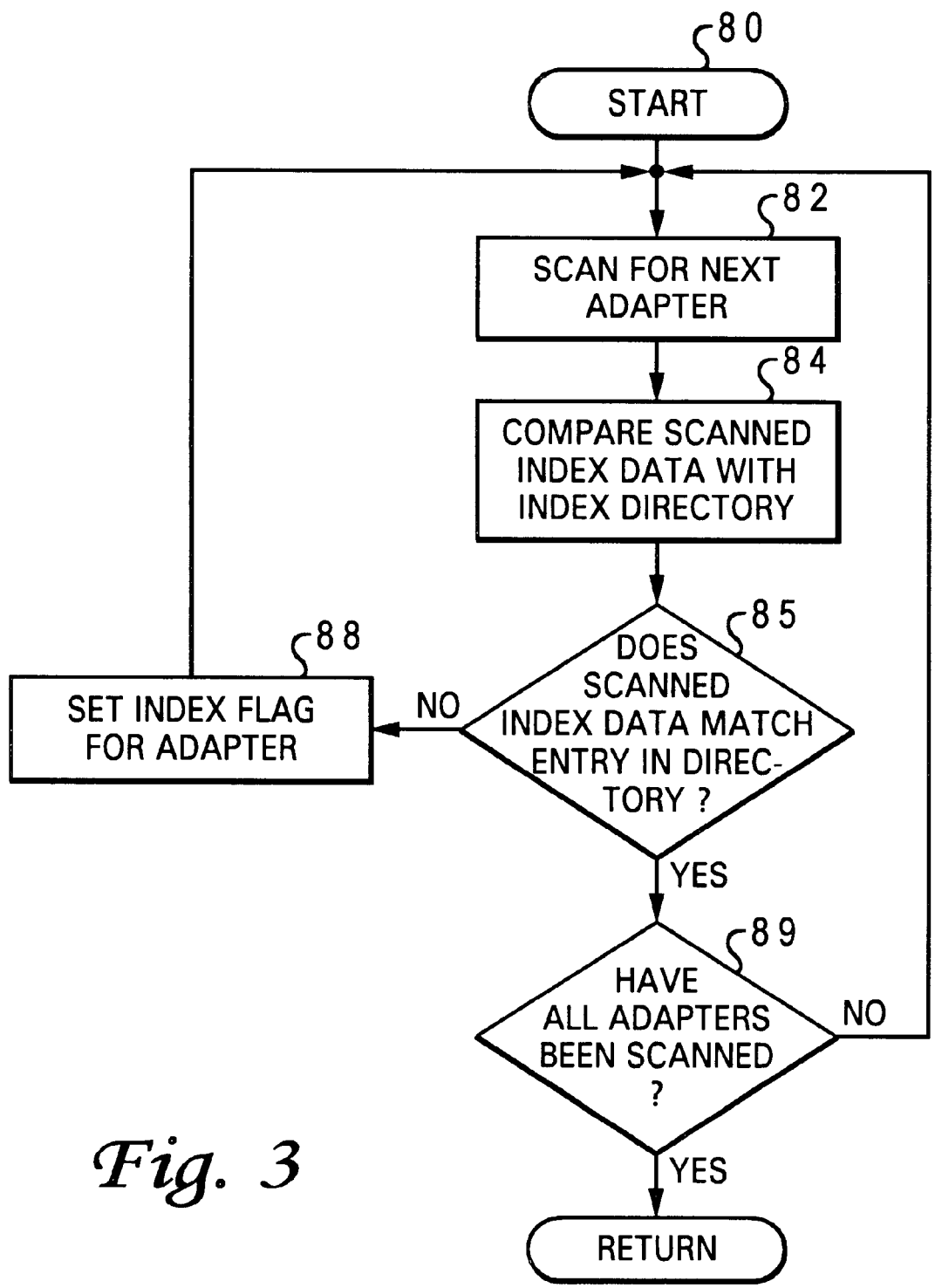
FIG. 3 depicts a high level logic flowchart illustrating a process for scanning each adapter included along a PCI bus according to the method and system of the present invention.

With reference now to FIG. 3, there is depicted a high level logic flowchart illustrating a process for scanning each adapter included along a busses within a data processing system and in particular a PCI bus according to the method and system of the present invention. As illustrated, the process starts at block 80 and proceeds to block 82. Block 82 depicts scanning the next adapter is along a PCI bus for the index data assigned to the adapter. Thereafter, block 84 illustrates the comparison of the scanned index data with an index directory maintained with index data for each adapter. In particular, each adapter position which contains an adapter will be assigned an index number. With each index number, the system id for the particular adapter is stored with the index number when it is assigned. If a new adapter has been added to a slot which was not previously filled, no index assignment data will be available for the adapter. However, if an adapter has failed, and a new adapter installed in its place, the system id of the adapter will need to be rewritten to the same index number as previously assigned. Next, block 85 depicts a determination of whether or not the scanned system ID matches with the appropriate index number. If the scanned system ID does not match, the process passes to block 88. Block 88 depicts setting an index flag for the adapters. If the scanned data does match, the process passes to block 89. Block 89 illustrates a determination of whether or not all the adapters have been scanned. If all adapters have been scanned, the process returns. If all the adapters have not been scanned, the process passes to block 82 to scan the next adapter for index data.

Figure 4:
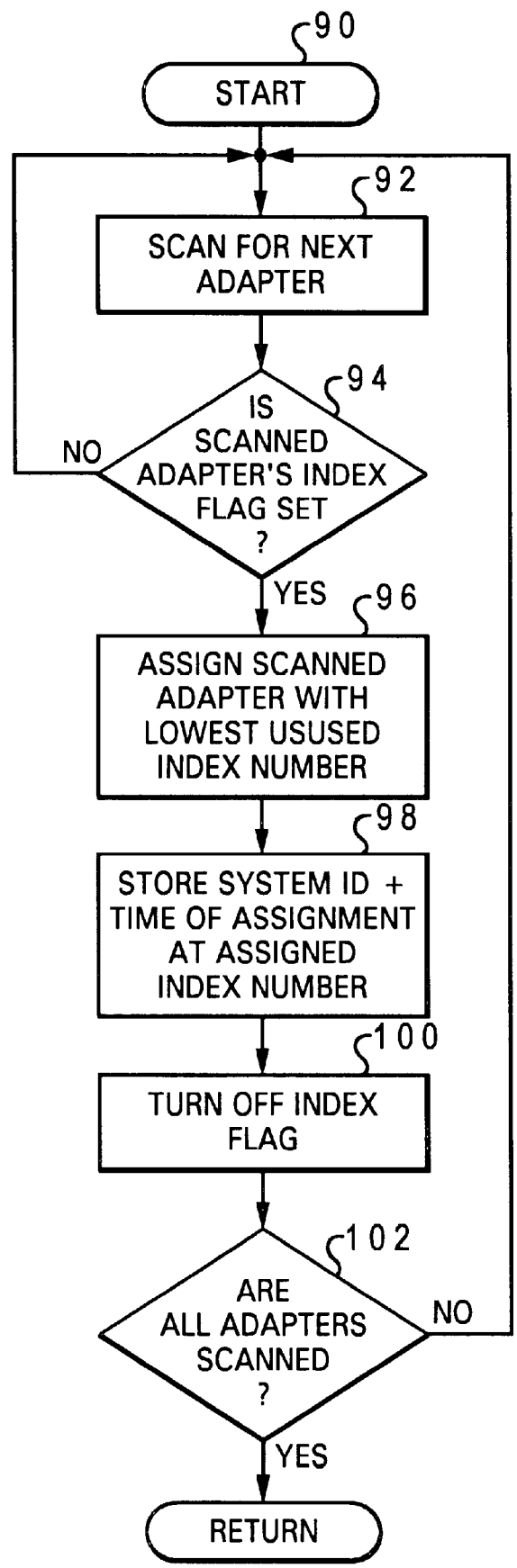
FIG. 4 illustrates a high level logic flowchart depicting a process for scanning each adapter along a PCI bus for which an index flag has been set according to the method and system of the present invention.

Referring now to FIG. 4, there is illustrated a high level logic flowchart depicting a processes for scanning each adapter for which an index flag has been set where the adapters are scanned along a bus and in particular a PCI bus according to the method and system of the present invention. As depicted, the process starts at block 90 and thereafter proceeds to block 92. Block 92 illustrates scanning for the next adapter. Thereafter, the process proceeds to block 94. Block 94 depicts a determination of whether or not the scanned adapter is flagged. If the scanned adapter is not flagged, the process passes to block 92 and scans for the next adapter. If the scanned adapter is flagged, the process passes to block 96. Block 96 illustrates the assignment of the flagged adapter with index data including the lowest unused index value. Thereafter, block 98 depicts storing the assigned data for the scanned adapter in the index directory. Next, block 100 illustrates turning off the index flag for the scanned adapter. Thereafter, block 102 depicts a determination of whether or not all the adapters have been scanned. If all the adapters have been scanned, the process returns. If all the adapters have not been scanned, the process passes to block 92 where the next adapter is scanned.

Figure 5:
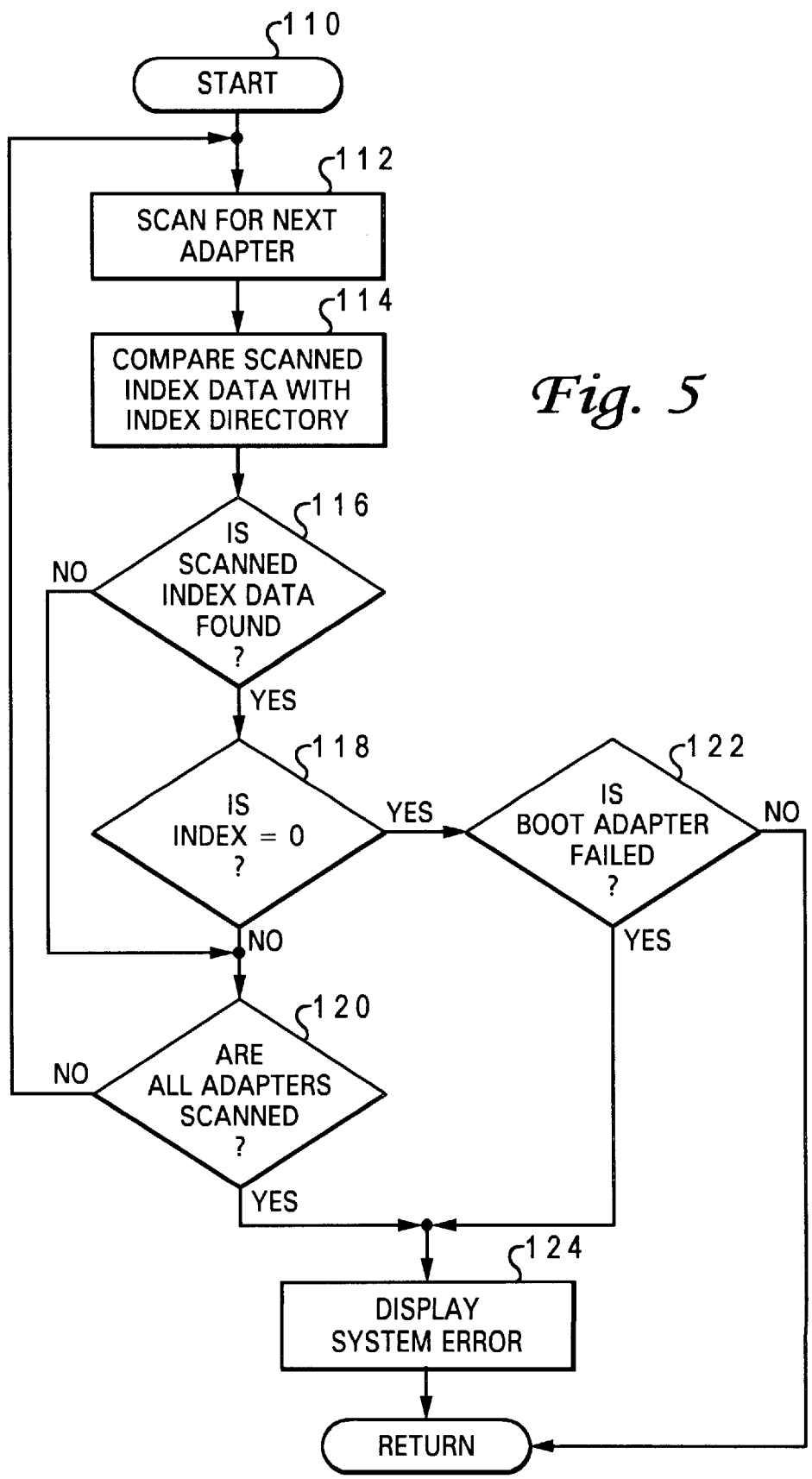
FIG. 5 depicts a high level logic flowchart illustrating a process for scanning each adapter along a PCI bus for the boot adapter according to the method and system of the present invention.

With reference now to FIG. 5, there is depicted a high level logic flowchart illustrating a process for scanning each adapter along a bus and in particular a PCI bus for the boot adapter according to the method and system of the present invention. An interrupt 13 adapter BIOS may be utilized when booting a data processing system for operation from a floppy disk or hard drive. Interrupt 13 adapter BIOS utilizes the boot adapter to start operation. Preferably, the boot adapter, therefore, is assigned the lowest index number, or is assigned an index number which is always recognized by the Interrupt 13 adapter BIOS. The process for starting said operation through said boot adapter starts at block 110 and thereafter proceeds to block 112. Block 112 depicts scanning for the next adapter. Thereafter, block 114 illustrates the comparison of the scanned system ID with the system IDs stored in the persistent memory of the data processing system. Next, block 116 depicts a determination of whether or not the scanned system ID is found within the index assignments. If the scanned system ID is not found, the process passes to block 120. If the scanned system ID is found, the process passes to block 118.

Block 118 depicts a determination of whether or not the scanned system ID is assigned to index number=0. If the scanned system ID is not assigned to index number=0. then the process passes to block 120. If the scanned system ID is assigned to index number=0, then the process passes to block 122. Block 122 illustrates a determination of whether or not the boot adapter is failed. If the boot adapter is failed, the process passes to block 124. Block 124 depicts the display of a system error to the user whereby the user has the option to replace the failed boot adapter, or to reconfigure the system's persistent area to change the index number for the boot adapter. If the boot adapter is not failed, the process returns and the Interrupt 13 adapter BIOS may continue operation within the data processing system.

Block 120 depicts a determination of whether or not all the adapters have been scanned. If all the adapters have not been scanned, the process passes to block 112. If all the adapters have been scanned, the process passes to block 124. Again, block 124 depicts a system error message to the user because a boot adapter has not been identified. Thereafter, the process returns and waits for a user choice.

While the invention has been particularly shown and described with reference to a preferred embodiment, it will be understood by those skilled in the art that various changes in form and detail may be made therein without departing from the spirit and scope of the invention.

What is claimed is:

1. A method of indexing adapters within a data processing system, where said data processing system contains a plurality of existing adapters, where each of said plurality of existing adapters is identified by particular indexing data, said method comprising the steps of:

scanning all adapters within said data processing system;

determining if any additional adapters have been added to said data processing system in addition to said plurality of existing adapters; and assigning particular indexing data to any said additional adapters in response to determining that additional adapters have been added to said data processing system, where any said additional adapters added to said data processing system are indexed into said data processing system without changing said particular indexing data of each of said plurality of existing adapters.

2. The method of indexing adapters into a data processing system according to claim 1, said step of determining if any additional adapters have been added to said data processing system in addition to said plurality of existing adapters further comprising the steps of:

comparing a system ID for each scanned adapter with a plurality of stored system IDs, and flagging an adapter as an additional adapter if a system ID for a scanned adapter does not match any of said plurality of stored system IDs.

3. The method of indexing adapters into a data processing system according to claim 1, said step of assigning particular indexing data to any said additional adapters in response to determining that additional adapters have been added to said data processing system, where any said additional adapters added to said data processing system are indexed into said data processing system without changing said particular indexing data of each of said plurality of existing adapters, further comprising the steps of:

assigning an unused index number to each of said addition adapters;

storing a system ID from each of said additional adapters with said unused index number assigned thereto.

4. The method of indexing adapters into a data processing system according to claim 3, said method further comprising the step of:

storing a time of assignment for each of said additional adapters with said unused index number assigned thereto.

5. The method of indexing adapters into a data processing system according to claim 1, wherein said additional adapters comprise hot plug adapters.

6. A system for indexing adapters within a data processing system, where said data processing system contains a plurality of existing adapters, where each of said plurality of existing adapters is identified by particular indexing data, said system comprising:

means for scanning all adapters within said data processing system;

means for determining if any additional adapters have been added to said data processing system in addition to said plurality of existing adapters; and means for assigning particular indexing data to any said additional adapters in response to determining that additional adapters have been added to said data processing system, where any said additional adapters added to said data processing system are indexed into said data processing system without changing said particular indexing data of each of said plurality of existing adapters.

7. The system for indexing adapters into a data processing system according to claim 6, said means for determining if any additional adapters have been added to said data processing system in addition to said plurality of existing adapters further comprising:

means for comparing a system ID for each scanned adapter with a plurality of stored system IDs; and means for flagging an adapter as an additional adapter if a system ID for a scanned adapter does not match any of said plurality of stored system IDs.

8. The system for indexing adapters into a data processing system according to claim 6, said means for assigning particular indexing data to any said additional adapters in response to determining that additional adapters have been added to said data processing system, where any said additional adapters added to said data processing system are indexed into said data processing system without changing said particular indexing data of each of said plurality of existing adapters, further comprising:

- means for assigning an unused index number to each of said addition adapters;
- means for storing a system ID from each of said additional adapters with said unused index number assigned thereto.

9. The system for indexing adapters into a data processing system according to claim 8, said method further comprising:

- means for storing a time of assignment for each of said additional adapters with said unused index number assigned thereto.

10. The system for indexing adapters into a data processing system according to claim 6, wherein said additional adapters comprise hot plug adapters.

11. A program product for indexing adapters within a data processing system, where said data processing system contains a plurality of existing adapters, where each of said plurality of existing adapters is identified by particular indexing data, said program product comprising:

- a data processing system usable medium;
- a index assignment controller encoded with said data processing system usable medium that, in response to a instruction to scan said adapters:
- scans all adapters within said data processing system;
- determines if any additional adapters have been added to said data processing system in addition to said plurality of existing adapters; and
- assigns particular indexing data to any said additional adapters in response to determininig that additional adapters have been added to said data processing system, where any said additional adapters added to said data processing system are indexed into said data processing system without changing said particular indexing data of each of said plurality of existing adapters.

12. The program product for indexing adapters into a data processing system according to claim 11, wherein said index assignment controller:

- compares a system ID for each scanned adapter with a plurality of stored system IDs; and
- flags an adapter as an additional adapter if a system ID for a scanned adapter does not match any of said plurality of stored system IDs.

13. The program product for indexing adapters into a data processing system according to claim 11, wherein said index assignment controller:

- assigns an unused index number to each of said addition adapters;
- stores a system ID from each of said additional adapters with said unused index number assigned thereto.

14. The program product for indexing adapters into a data processing system according to claim 13, wherein said index assignment controller:

- stores a time of assignment for each of said additional adapters with said unused index number assigned thereto.

15. The program product for indexing adapters into a data processing system according to claim 11, wherein said additional adapters comprise hot plug adapters.

\* \* \* \* \*